United States Patent
Taglini

(10) Patent No.: US 11,813,817 B2
(45) Date of Patent: Nov. 14, 2023

(54) PRODUCTION METHOD FOR PRODUCING A SEALED BREAK-OPEN PACKAGE AND CORRESPONDING SEALED BREAK-OPEN PACKAGE

(71) Applicant: Easysnap Technology S.r.l., Modena (IT)

(72) Inventor: Andrea Taglini, Modena (IT)

(73) Assignee: Easysnap Technology S.r.l., Modena (IT)

( * ) Notice: Subject to any disclaimer, the term of this patent is extended or adjusted under 35 U.S.C. 154(b) by 776 days.

(21) Appl. No.: 16/962,765

(22) PCT Filed: Jan. 18, 2019

(86) PCT No.: PCT/IB2019/050433
§ 371 (c)(1),
(2) Date: Jul. 16, 2020

(87) PCT Pub. No.: WO2019/142143
PCT Pub. Date: Jul. 25, 2019

(65) Prior Publication Data
US 2020/0353709 A1   Nov. 12, 2020

(30) Foreign Application Priority Data

Jan. 18, 2018   (IT) .......................... 102018000001307

(51) Int. Cl.
*B65D 75/58*   (2006.01)
*B31B 70/00*   (2017.01)
(Continued)

(52) U.S. Cl.
CPC .............. *B31B 70/25* (2017.08); *B31B 70/84* (2017.08); *B32B 3/263* (2013.01); *B32B 27/06* (2013.01);
(Continued)

(58) Field of Classification Search
CPC ..... B31B 70/25; B31B 70/84; B32B 2307/31; B32B 2307/7244; B32B 2553/00;
(Continued)

(56) References Cited

U.S. PATENT DOCUMENTS

2005/0178086 A1\* 8/2005 Bakken ................... B65B 61/18
53/412
2010/0065582 A1\* 3/2010 Nelson ................... B65D 51/00
206/459.5

(Continued)

FOREIGN PATENT DOCUMENTS

CN   101568477 A   10/2009
CN   103249651 A   8/2013
(Continued)

OTHER PUBLICATIONS

Chinese Office Action dated Sep. 29, 2021 for Chinese Patent Application No. 201980008670.9.
(Continued)

*Primary Examiner* — Dariush Seif
*Assistant Examiner* — Himchan Song
(74) *Attorney, Agent, or Firm* — McCarter & English, LLP

(57) ABSTRACT

A production method for producing a sealed break-open package comprising the steps of: making, through an outer surface of a sheet and by means of a first tool, an outer incision, which at least partially extends into the area of the pocket; and making, through an inner surface of the sheet opposite the outer surface and by means of a second tool, an inner incision, which is parallel to and aligned with the outer incision. The inner incision is made only after the outer incision has been completed and by making the second tool perform a working stroke, which brings a tip of the second tool inside the outer incision.

15 Claims, 13 Drawing Sheets

(51) Int. Cl.
  *B31B 70/84* (2017.01)
  *B32B 3/26* (2006.01)
  *B32B 27/06* (2006.01)
  *B65D 65/40* (2006.01)
  *B65D 75/30* (2006.01)

(52) U.S. Cl.
  CPC ............ *B65D 65/40* (2013.01); *B65D 75/30* (2013.01); *B65D 75/585* (2013.01); *B32B 2307/31* (2013.01); *B32B 2307/7244* (2013.01); *B32B 2553/00* (2013.01)

(58) Field of Classification Search
  CPC ......... B32B 27/06; B32B 3/263; B65D 65/40; B65D 75/30; B65D 75/585
  See application file for complete search history.

(56) References Cited

U.S. PATENT DOCUMENTS

| | | | | |
|---|---|---|---|---|
| 2011/0100859 | A1* | 5/2011 | Burattini | B65D 75/585 206/524.6 |
| 2014/0209700 | A1* | 7/2014 | Olchovy | A61L 9/12 239/34 |
| 2015/0307260 | A1* | 10/2015 | Reggio | B65D 75/585 206/531 |
| 2020/0398516 | A1* | 12/2020 | Amato | B26D 5/06 |
| 2021/0061508 | A1* | 3/2021 | Gustvasson | B65B 51/306 |

FOREIGN PATENT DOCUMENTS

| | | |
|---|---|---|
| CN | 110498121 A | 11/2019 |
| EP | 2944579 | 11/2015 |
| EP | 2944579 A2 | 11/2015 |
| ES | 2120413 T3 | 11/1998 |
| KR | 101597150 B1 | 2/2016 |
| WO | WO 2009/040629 A1 | 4/2009 |
| WO | WO2009040629 A2 | 4/2009 |

OTHER PUBLICATIONS

Italian Search Report dated Sep. 17, 2018 for Italian Patent Application 201800001307.
PCT International Search Report and Written Opinion dated Mar. 12, 2019 for PCT/IB2019/050433.

* cited by examiner

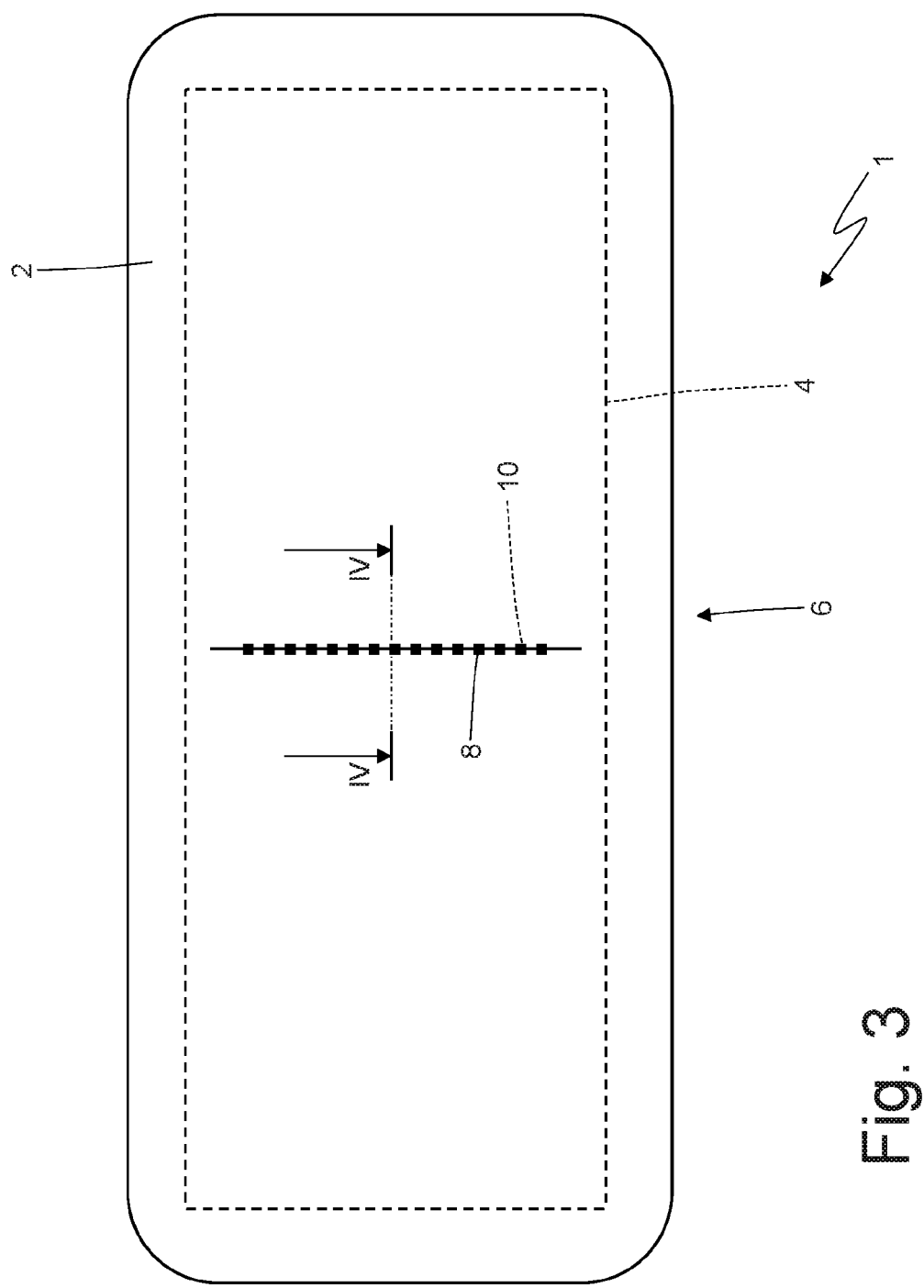

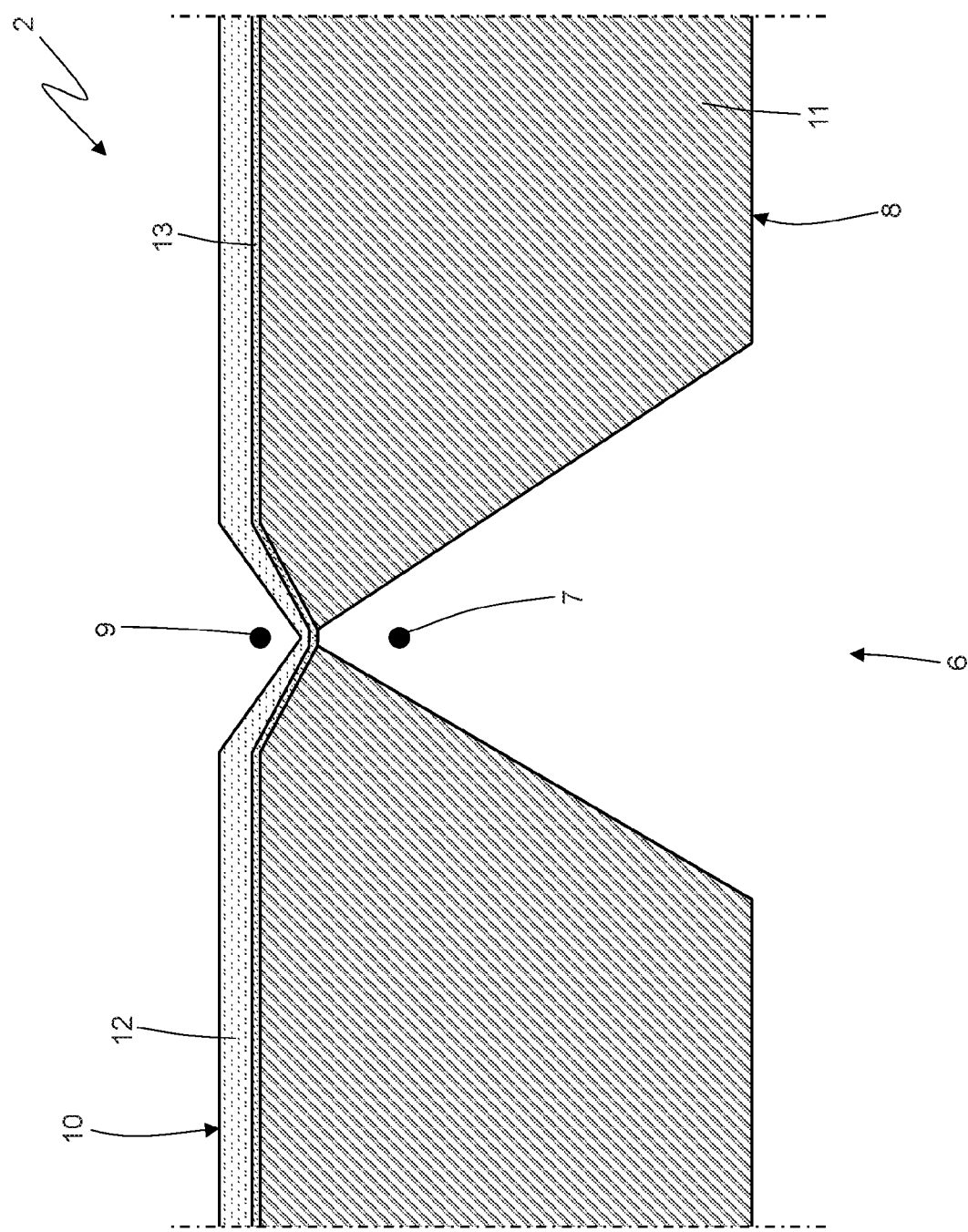

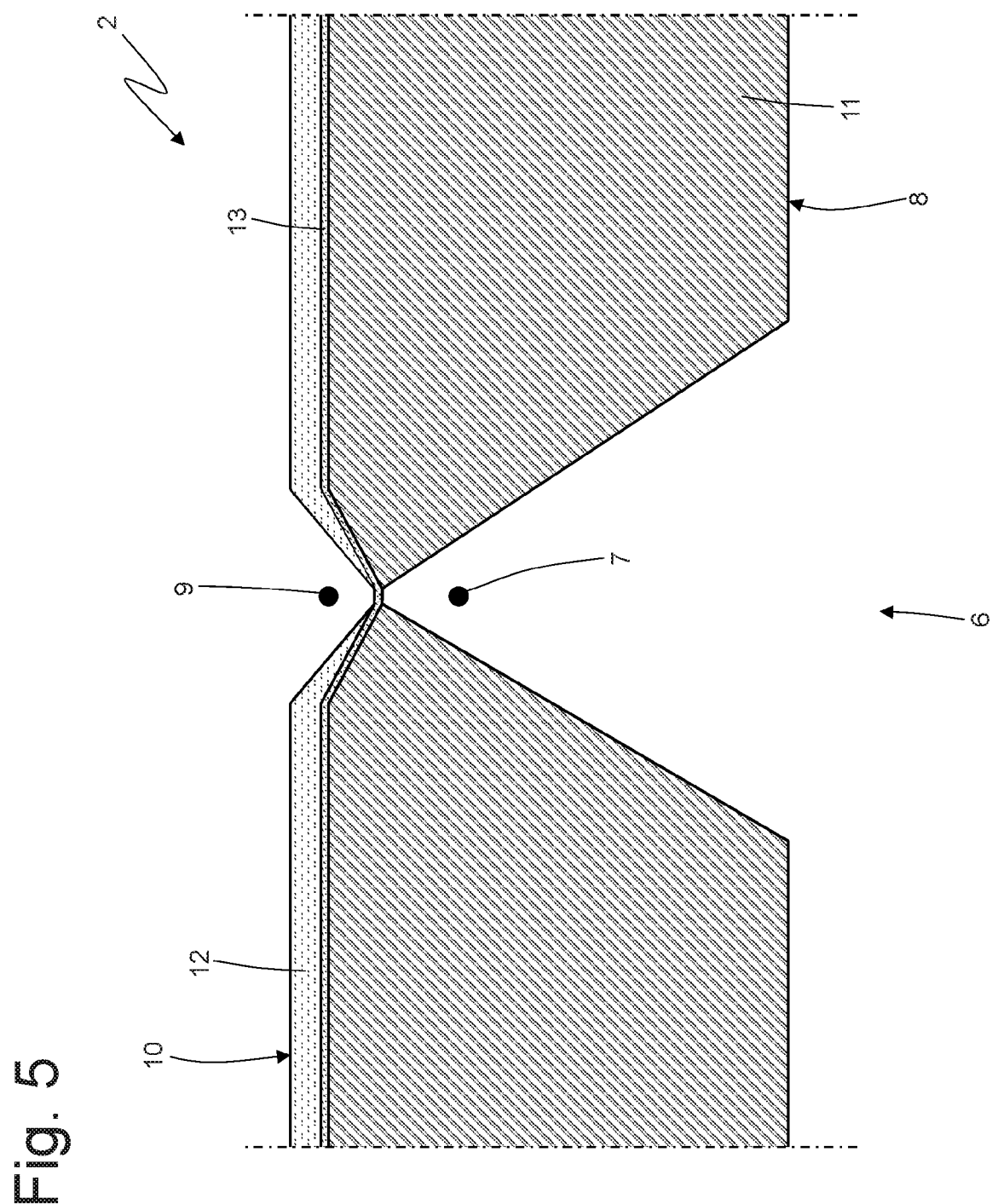

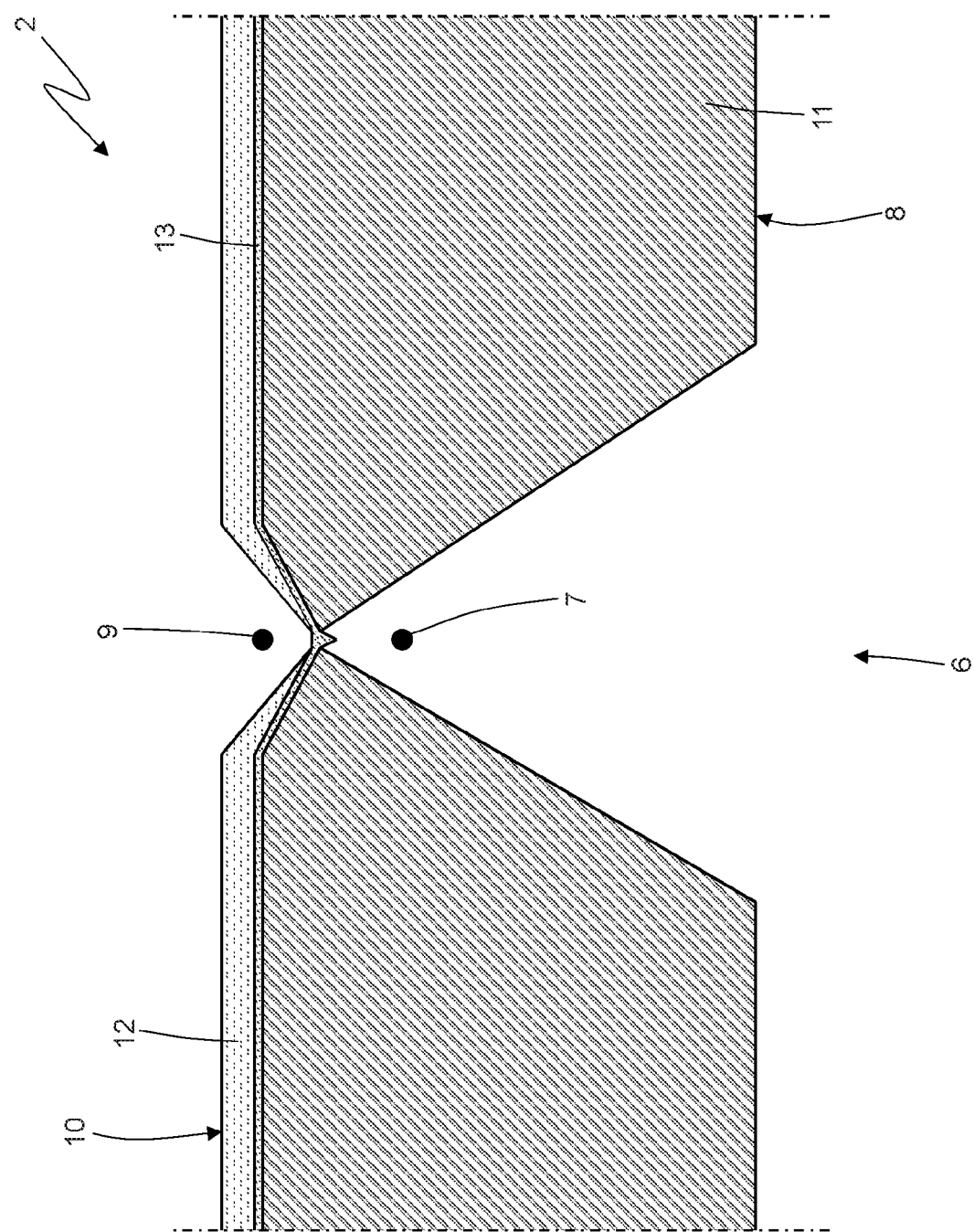

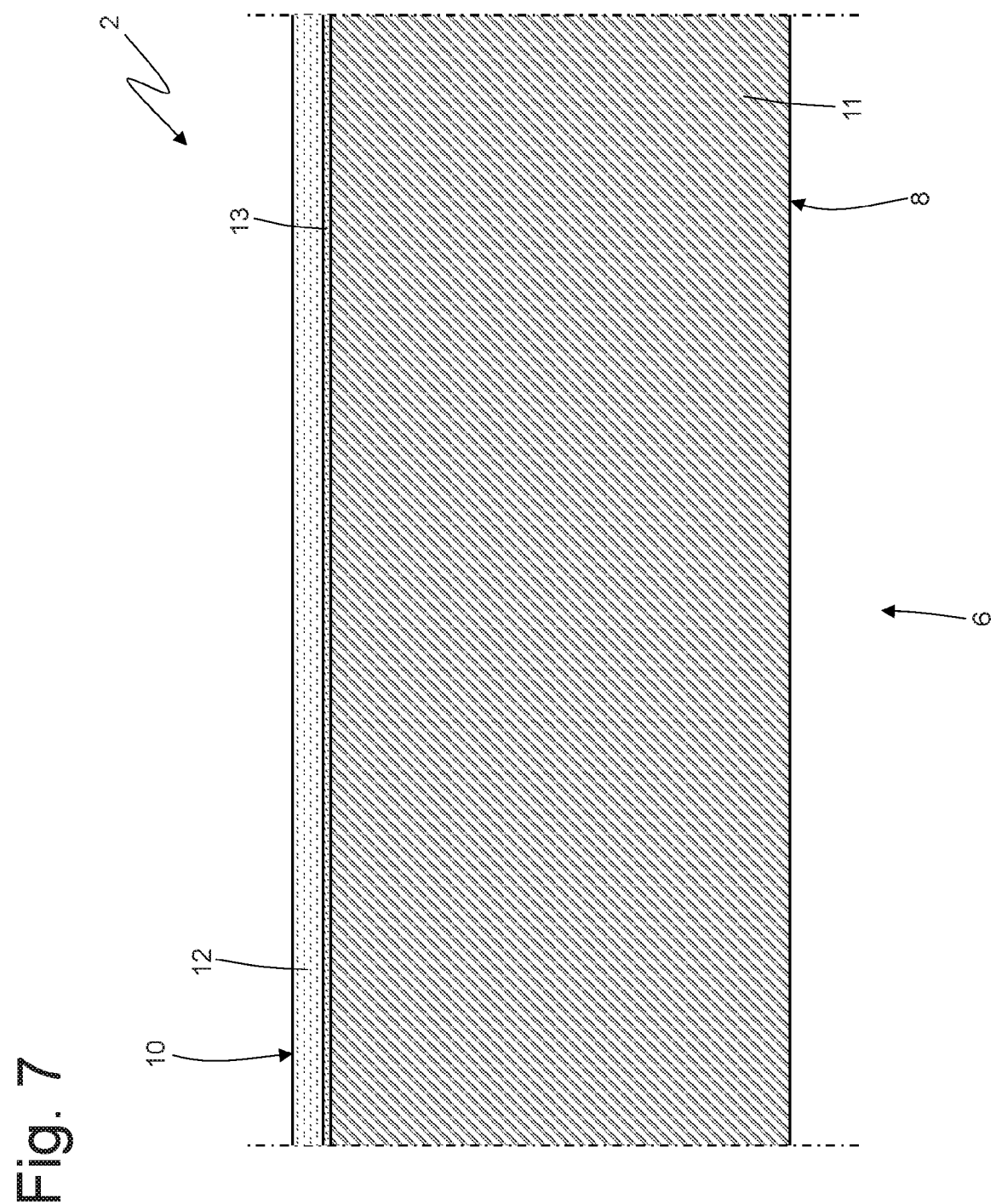

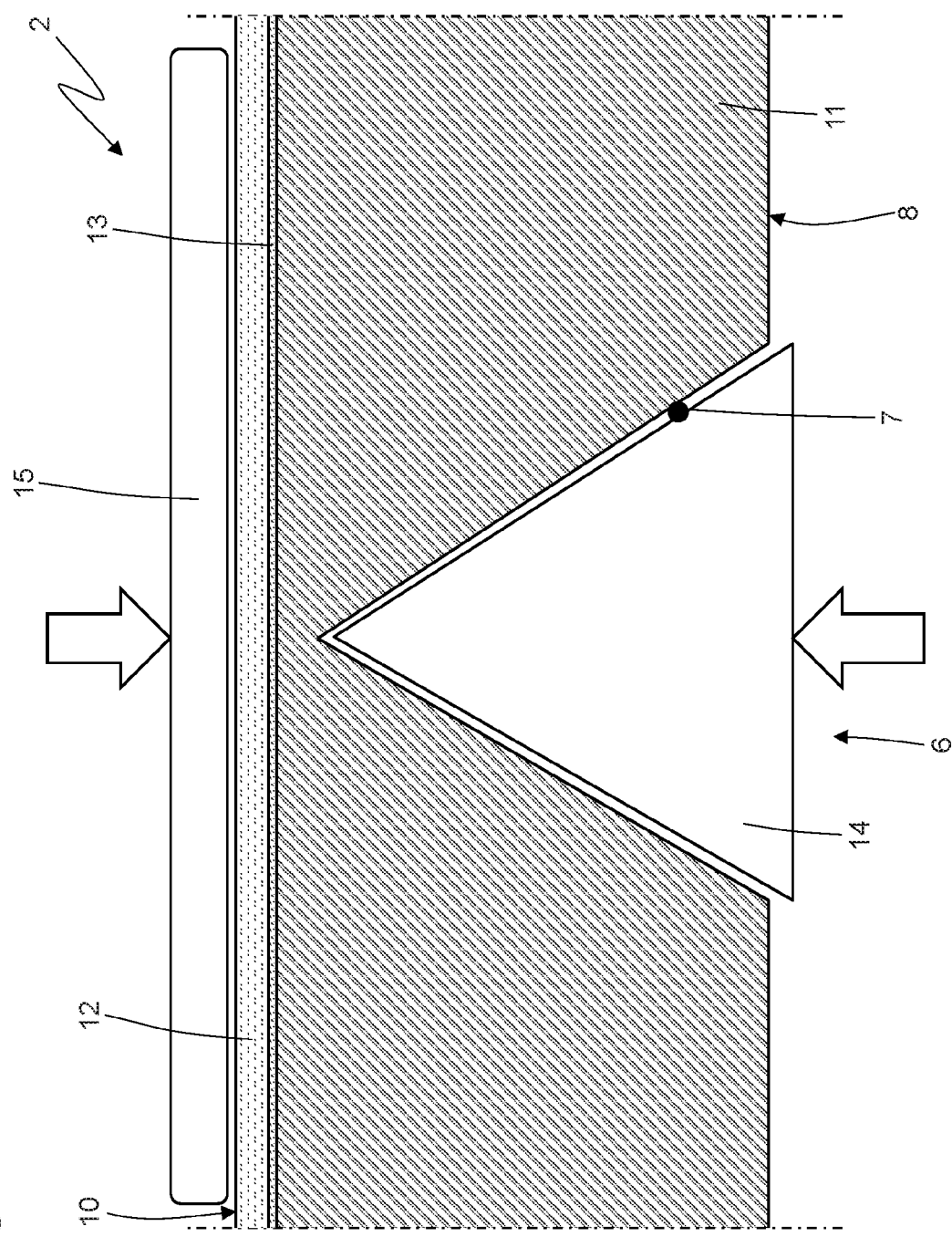

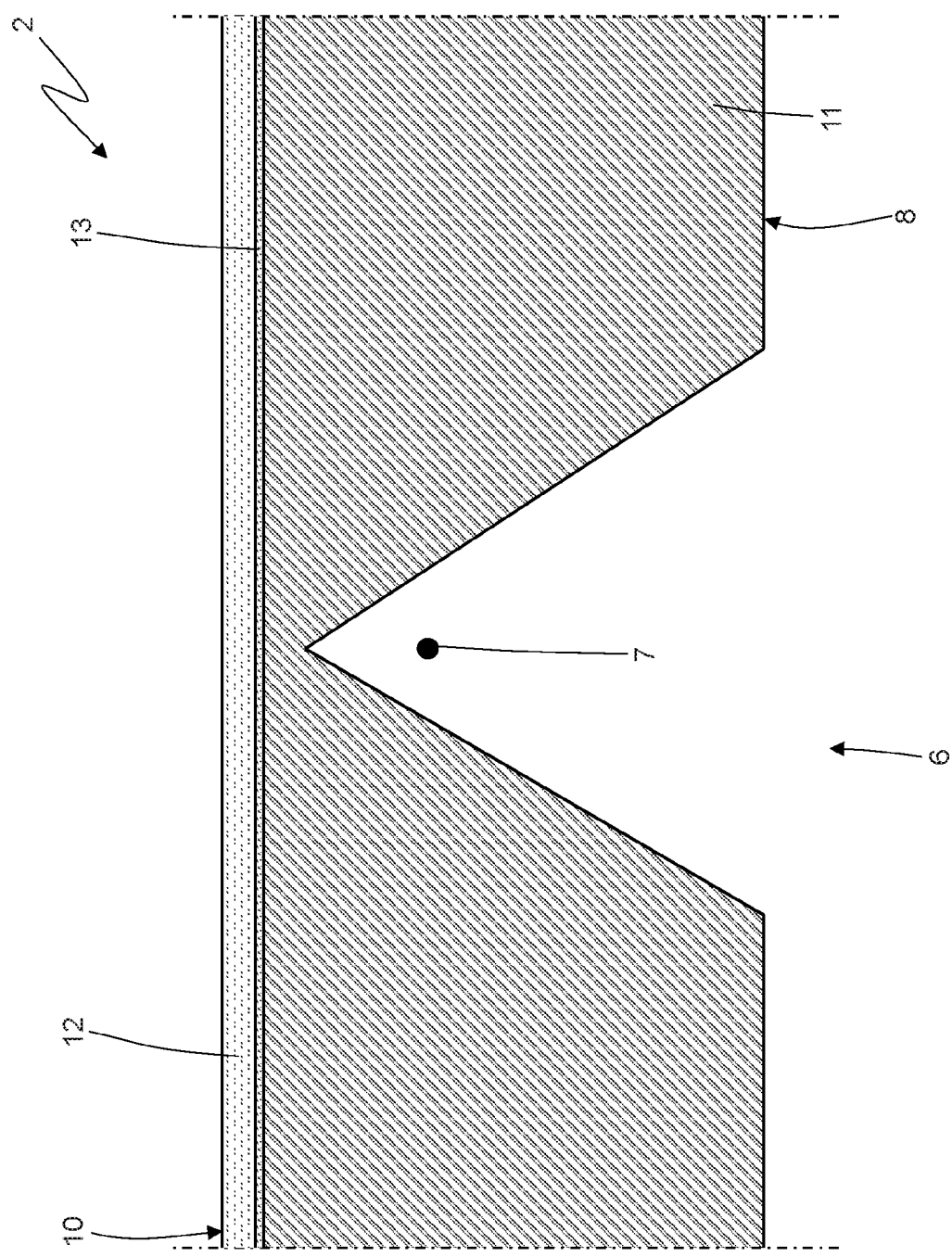

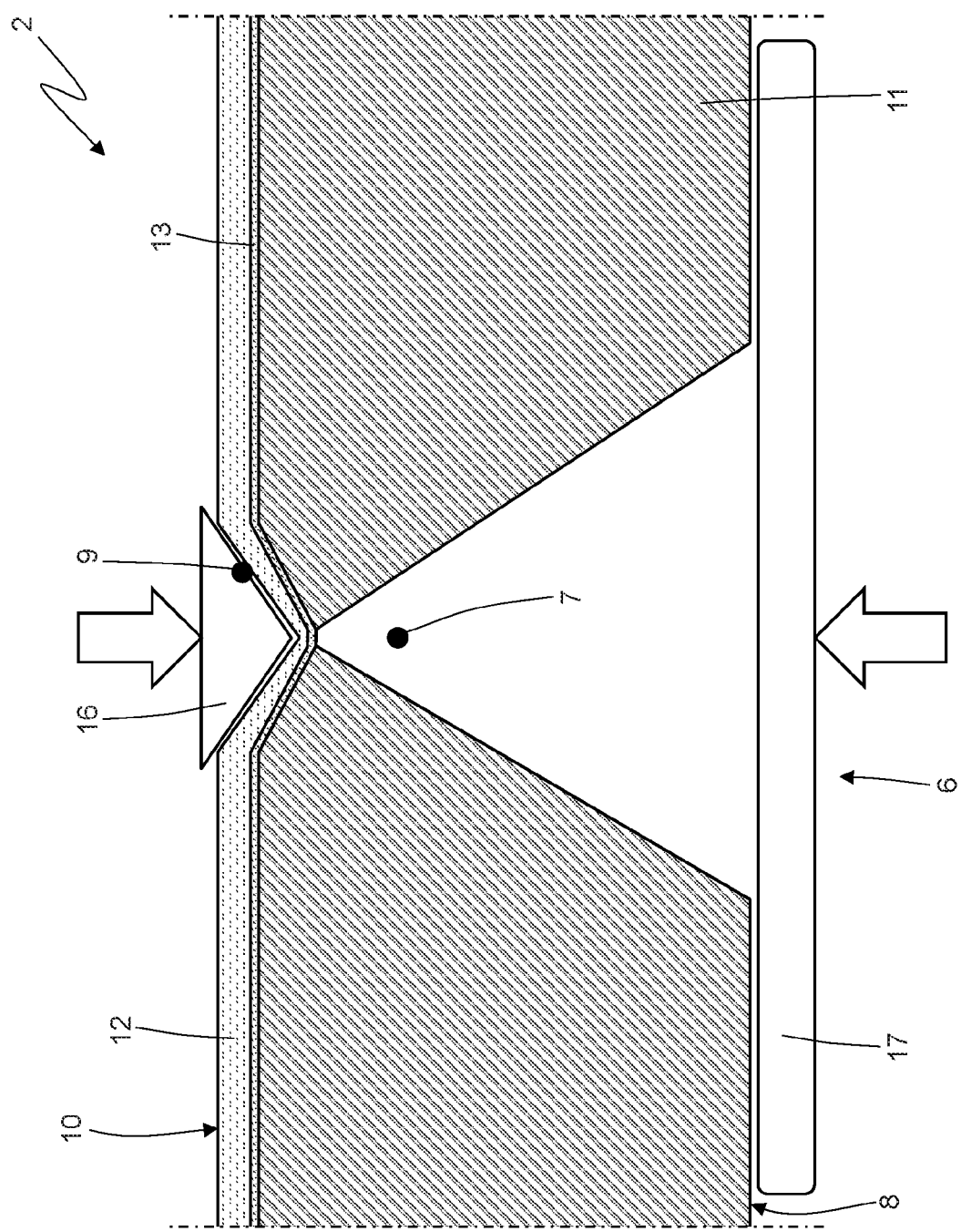

PRODUCTION METHOD FOR PRODUCING
A SEALED BREAK-OPEN PACKAGE AND
CORRESPONDING SEALED BREAK-OPEN
PACKAGE

CROSS-REFERENCE TO RELATED APPLICATIONS

This patent application is a 35 U.S.C. § 371 National Stage filing of International Application No. PCT/IB2019/050433, filed on Jan. 18, 2019, which application claims priority from Italian patent application no. 102018000001307 filed on Jan. 18, 2018, the entire disclosure of which is incorporated herein by reference.

TECHNICAL FIELD

The present invention relates to a production method for producing a sealed break-open package and to a corresponding sealed break-open package.

PRIOR ART

Patent application WO2009040629A2 discloses a sealed single-dose break-open package; the sealed package comprises a sheet of semi-rigid plastic material and a sheet of flexible plastic material, which is superimposed on and sealed to the sheet of semi-rigid plastic material to define a sealed pocket containing a dose of a fluid product. The sheet of semi-rigid plastic material has a central pre-weakened area for guiding controlled breakage of the sheet of semi-rigid plastic material in order to cause the formation of an outlet opening for the product through said sheet of semi-rigid plastic material. In other words, in use, in order to open the sealed package, a user must grab said sealed package with the fingers of one hand and bend the sealed package into a "V" until the sheet of semi-rigid plastic material breaks in the pre-weakened area. The pre-weakened area comprises an inner incision, which is formed through an inner surface (i.e. facing the pocket) of the sheet of semi-rigid plastic material, and an outer incision, which is formed through an outer surface of the sheet of semi-rigid plastic material and is aligned with the inner incision.

The sealed single-dose package described in patent application WO2009040629A2 has optimum functionality; however, its production is relatively complex (i.e. it requires the use of a very precise and perfectly adjusted incision unit) since the two (inner and outer) incisions must be made with great precision in order to avoid damage to the barrier layer, and at the same time allow immediate breaking of the sheet of semi-rigid plastic material when the sealed package is bent into a "V".

Patent application US2014209700A1 and patent KR101597150B1 also describe a sealed break-open package wherein a pre-weakened area is created in a central area of a sheet so as to guide, following a bending of the sheet, a controlled breaking of the sheet in the pre-weakened area in order to cause the formation of an outlet opening for the product through the sheet. The pre-weakened area comprises an inner incision, which is formed through an inner surface (i.e. facing a pocket containing a product) of the sheet, and an outer incision, which is formed through an outer surface of the sheet and is aligned with the inner incision.

Patent application EP2944579A2 discloses a unit for the incision of a strip made of a plastic material to cut two distinct incisions into two opposite surfaces of the strip. the incision unit has: a conveying device, which feeds the strip along a conveying direction; two support plates, which are arranged on opposite sides of the strip, so that each support plate faces a corresponding surface of the strip; and at least two incision devices, each of which cuts an incision into a corresponding surface of the strip (15) and has a cutting element, which is supported by a support plate, and a contrast element, which is supported by the other support plate.

DESCRIPTION OF THE INVENTION

The aim of the present invention is to provide a production method for producing a sealed break-open package, which can be manufactured in a simple and inexpensive manner.

According to the present invention, a method for the production of a sealed break-open package and a corresponding sealed break-open package are provided as set forth in the appended claims.

The claims describe preferred embodiments of the present invention forming an integral part of the present specification.

BRIEF DESCRIPTION OF THE DRAWINGS

The present invention will now be described with reference to the accompanying drawings, which illustrate a non-limiting embodiment thereof, in which:

FIG. 3 is a bottom view of the sealed package of FIG. 1;

FIG. 4 is a sectional view along the section line IV-IV of a sheet of semi-rigid plastic material of the sealed package of FIG. 1;

FIGS. 5 and 6 are two sectional views along the section line IV-IV of respective alternative embodiments of the sheet of semi-rigid plastic material;

FIGS. 7-10 show the sheet of semi-rigid plastic material during the making of an inner incision and an outer incision;

PREFERRED EMBODIMENTS OF THE INVENTION

Figure 2:
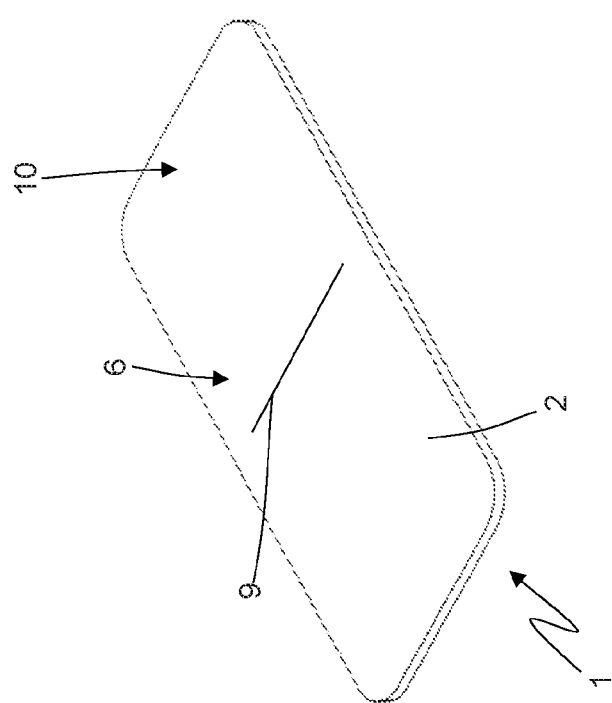
FIG. 2 is a bottom perspective view of the sealed package of FIG. 1.
Figure 1:
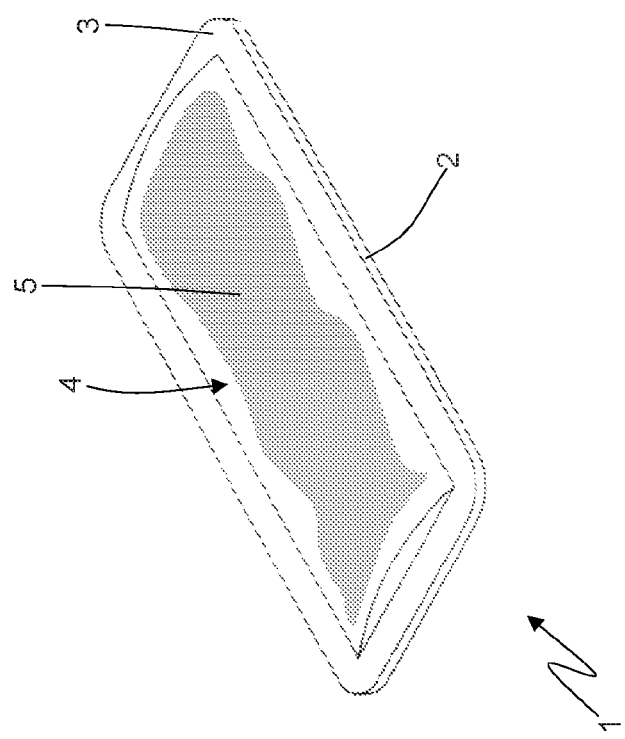
FIG. 1 is a top perspective view of a sealed single-dose break-open package manufactured in accordance with the present invention.

Numeral 1 in FIGS. 1, 2 and 3 indicates, as a whole, a sealed single-dose break-open package. The sealed single-dose package 1 comprises a sheet 2 of semi-rigid plastic material, substantially rectangular in shape, and a sheet 3 of flexible plastic material, substantially rectangular in shape (only visible in FIG. 1), which is superimposed on and sealed to the sheet 2 of semi-rigid plastic material so as to define a sealed pocket 4 containing a dose of a fluid (liquid, creamy or powder) product 5.

The sheet 2 of semi-rigid plastic material has a central pre-weakened area 6 (visible in FIGS. 2 and 3), which is formed in a central area of the sheet 2 of semi-rigid plastic material (in particular in a longitudinally centred area), extends transversely (i.e. parallel to the shorter sides of the sheet 2 of semi-rigid plastic material), and guides a controlled breakage of the sheet 2 of semi-rigid plastic material so as to cause the formation of an outlet opening for the product 5 through said sheet 2 of semi-rigid plastic material. In other words, in use, in order to open the sealed single-dose package 1, a user must grab said sealed single-dose package with the fingers of one hand and bend the sealed single-dose package 1 into a "V" until the sheet 2 of semi-rigid plastic material breaks in the pre-weakened area 6. By breaking the sheet 2 of semi-rigid plastic material in the pre-weakened area 6, the product 5 (preferably a liquid) can be let out of the sealed single-dose package 1 in a simple and hygienic manner.

As shown in FIGS. 3 and 4, the pre-weakened area 6 comprises an outer incision 7, which is oriented transversely (i.e. parallel to the shorter sides of the sheet 2 of semi-rigid plastic material), and is formed through an outer surface 8 (i.e. opposite the pocket 4) of the sheet 2 of semi-rigid plastic material. The outer incision 7 extends into the area of the pocket 4 (i.e. the outer incision 7 is superimposed on the pocket 4).

Moreover, the pre-weakened area 6 comprises an inner incision 9, which is oriented transversely, is parallel to and aligned with the outer incision 7, and is formed through an inner surface 10 (i.e. facing the pocket 4) of the sheet 2 of semi-rigid plastic material opposite the outer surface 8. The inner incision 9 is perfectly aligned with (i.e. superimposed on) the outer incision 7 and only extends into the area of the pocket 4 (i.e. the inner incision 9 is completely superimposed on the pocket 4) and into the area of the outer incision 7 (i.e. the inner incision 9 is completely superimposed on the outer incision 7). In other words, the inner incision 9 only extends into the area in which the pocket 4 (on the side of the inner surface 10 of the sheet 2 of semi-rigid plastic material) and the outer incision 7 (on the side of the outer surface of the sheet 2 of semi-rigid plastic material) are simultaneously located.

According to the embodiment shown in FIGS. 4 and 5, the sheet 2 of semi-rigid plastic material is made up of a laminate comprising a supporting layer 11 arranged on the outside (i.e. on the opposite side of the pocket 4 and in the area of the outer surface 8) and a heat-sealable layer 12 arranged on the inside (i.e. on the same side of the pocket 4, in the area of the inner surface 10 and in contact with the sheet 3 of flexible plastic material). An insulating or barrier layer 13 serving the purpose of ensuring air- and/or light-tightness is provided between the supporting layer 11 and the heat-sealable layer 12. By way of non-limiting example, the sheet 2 of semi-rigid plastic material may be made up of a white polystyrene (PS) supporting layer 11 having a thickness of 400 microns (±8%), an "EVOH" or aluminium barrier layer 13 having a thickness of 7 microns (±8%), and a polyethylene (PE) heat-sealable layer 12 having a thickness of 43 microns (±8%).

The outer incision 7 is formed through the outer surface 8 of the sheet 2 of semi-rigid plastic material, has a "V" shape (but could also have a slightly different shape), and is made by locally deforming the sheet 2 of semi-rigid plastic material; in particular, the outer incision 7 is made by only deforming the supporting layer 11 of the sheet 2 of semi-rigid plastic material, i.e. the outer incision 7 only affects the supporting layer 11 of the sheet 2 of semi-rigid plastic material.

The inner incision 9 is formed through the inner surface 10 of the sheet 2 of semi-rigid plastic material, has a "V" shape (but could also have a slightly different shape), and is made by locally deforming the sheet 2 of semi-rigid plastic material; in particular, the inner incision 9 is made by deforming all three layers, i.e. the supporting layer 11, the heat-sealable layer 12 and the barrier layer 13, of the sheet 2 of semi-rigid plastic material.

The inner incision 9 is partially superimposed on the outer incision 7, i.e. the tip of the inner incision 9 is superimposed on the tip (hence "enters" the tip) of the outer incision 7; with this partial superimposition of the inner incision 9 on the outer incision 7, the heat-sealable layer 12, and especially the barrier layer 13 of the sheet of semi-rigid plastic material are pushed (becoming plastically deformed) into the outer incision 7, i.e. they partially penetrate (enter) the tip of the outer incision 7. In the embodiment shown in FIG. 4, both the heat-sealable layer 12 and the barrier layer 13 of the sheet 2 of semi-rigid plastic material partially penetrate (enter) the tip of the outer incision 7, while in the equivalent embodiment shown in FIG. 5, only the barrier layer 13 of the sheet 2 of semi-rigid plastic material partially penetrates (enters) the tip of the outer incision 7 (i.e. the heat-sealable layer 12 of the sheet 2 of semi-rigid plastic material tears in the vicinity of the tip of the outer incision 7 and does not penetrate into the tip of the outer incision 7). In some situations and as shown in FIG. 6, a certain "build-up" of the barrier layer 13 can occur in the area of the tip of the inner incision 9 (i.e. in the area of the tip of the outer incision 7).

In other words, between the bottom of the outer incision 7 and the bottom of the inner incision 9, the barrier layer 13 is present, the heat-sealable layer 12 is optionally present, but the supporting layer 11 is not present (i.e. it is absent). Accordingly, the supporting layer 11 has an interruption (i.e. it is interrupted, absent) in the area of the bottom of the outer incision 7 and, therefore, also in the area of the bottom of the inner incision 9.

Importantly, the barrier layer 13 of the sheet 2 of semi-rigid plastic material is locally plastically deformed (even in an irregular manner), but is not torn, i.e. it maintains its integrity, in the area of the inner incision 9. Thanks to the substantial integrity of the barrier layer 13 of the sheet 2 of semi-rigid plastic material even in the area of the inner incision 9 formed through the inner surface 10 of the sheet 2 of semi-rigid plastic material, it is possible to ensure a perfect insulation of the pocket 4, which is therefore also suitable to contain perishable products and/or products with a controlled bacterial load, such as food, medications or cosmetics. Obviously, during the break-opening of the sealed single-dose package 1 obtained by bending said sealed single-dose package 1 into a V shape, all three layers, i.e. the supporting layer 11, the heat-sealable layer 12 and the barrier layer 13, of the sheet 2 of semi-rigid plastic material need to be broken in the pre-weakened area 6.

As previously mentioned, the inner incision 9 only extends into the area where the pocket 4 is located, and therefore in the area of the inner incision 9 there are no welds between the sheet 2 of semi-rigid plastic material and the sheet 3 of flexible plastic material; accordingly, any local tearing of the heat-sealable layer 12 of the sheet 2 of semi-rigid plastic material in the area of the inner incision 9 has no negative consequence.

The production method used to make the outer incision 7 and the inner incision 9 in the sheet 2 of semi-rigid plastic material is described hereinafter with reference to FIGS. 7-10.

First of all, FIG. 7 shows the sheet 2 of semi-rigid plastic material without the incisions 7 and 9.

Initially and as shown in FIG. 8, only the outer incision 7 is made (i.e. not the inner incision 9) by means of a wedge-shaped tool 14, which is pushed into the sheet 2 of semi-rigid plastic material (in particular into the supporting layer 11) through the outer surface 8 and by means of a countering element 15, which rests against the inner surface 10 of the sheet 2 of semi-rigid plastic material (and therefore on the opposite side of the tool 14).

According to a possible embodiment, at first, the countering element 15 does not come into contact with the inner surface 10, but remains far from said inner surface (for example by a distance of 1-4 mm also according to the overall dimensions of the sealed package 1); accordingly, when the tool 14 comes into contact with the outer surface 8, at first, the sheet 2 of semi-rigid plastic material slightly bends into a "V" shape until it rests against the countering element 15, and only at this point the tool 14 starts penetrating the sheet 2 of semi-rigid plastic material (which is slightly bent into a "V" shape) through the outer surface 8.

After the outer incision 7 has been completed (as shown in FIG. 9), the inner incision 9 is subsequently made (in a second moment). As shown in FIG. 10, only the inner incision 9 is made (the outer incision 7 has been made previously, hence it is already there) by means of a wedge-shaped tool 16, which is pushed into the sheet 2 of semi-rigid plastic material (in particular into the three layers 11, 12 and 13) through the inner surface 10 and by means of a countering element 17, which rests against the outer surface 8 of the sheet 2 of semi-rigid plastic material (and therefore on the opposite side of the tool 16). The penetration of the tool 16 into the sheet 2 of semi-rigid plastic material is such as to cause the tip of the inner incision 9 to be superimposed on the tip (hence to "enter" the tip) of the outer incision 7. In other words, the inner incision 9 is made only after the outer incision 7 has been completed and by making the tool 16 perform a working stroke, which brings a tip of the tool 16 inside the outer incision 7 (in this way the tip of the inner incision 9 is superimposed on the tip of the outer incision 7). In other words, there is an interference area (an overlap) between the working stroke of the tool 14 that generates the outer incision 7 and the working stroke of the tool 16 that generates the inner incision 9, so that the tip of the inner incision 9 overlaps the tip of the outer incision 7.

According to a possible embodiment, at first, the countering element 17 does not come into contact with the outer surface 8, but remains far from said outer surface 8 (for example by a distance of 1-4 mm also according to the overall dimensions of the sealed package 1); accordingly, when the tool 16 comes into contact with the inner surface 10, at first, the sheet 2 of semi-rigid plastic material slightly bends into a "V" shape until it rests against the countering element 17, and only at this point the tool 16 starts penetrating the sheet 2 of semi-rigid plastic material (which is slightly bent into a "V" shape) through the inner surface 10.

Figure 12:
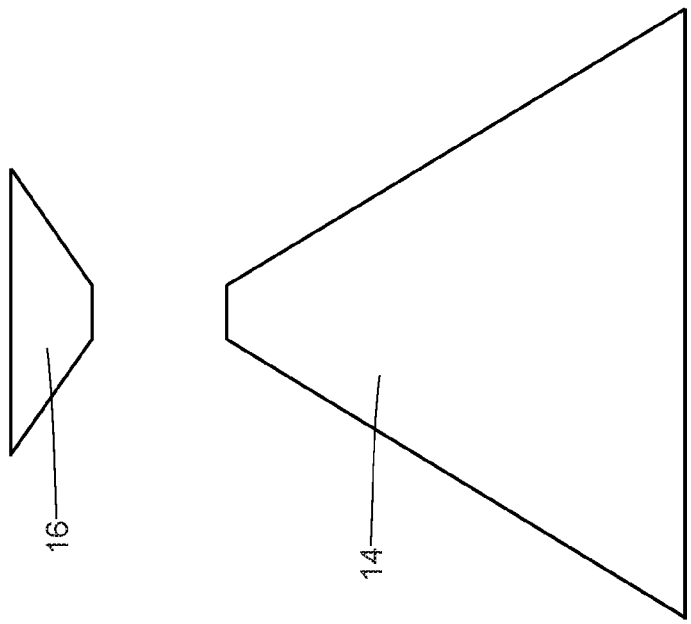
FIGS. 11, 12 and 13 show three possible embodiments of two tools that are used to make an outer incision and an inner incision in the sheet of semi-rigid plastic material.
Figure 11:
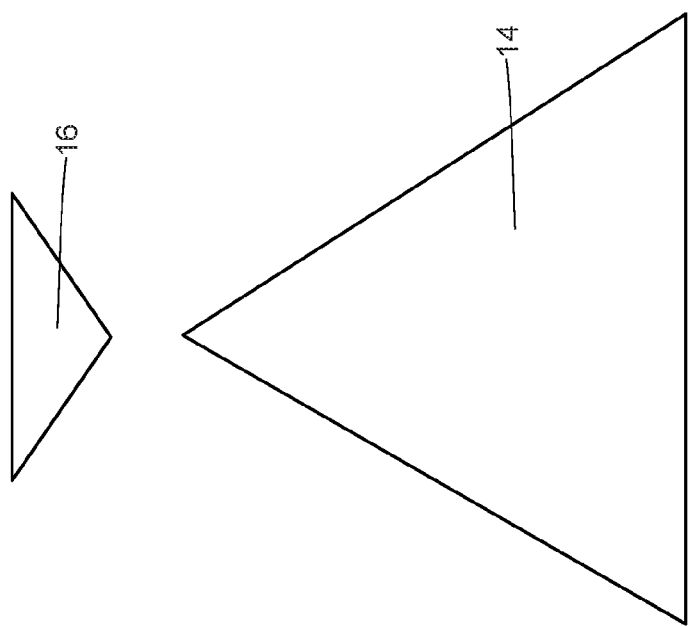
Figure 13:
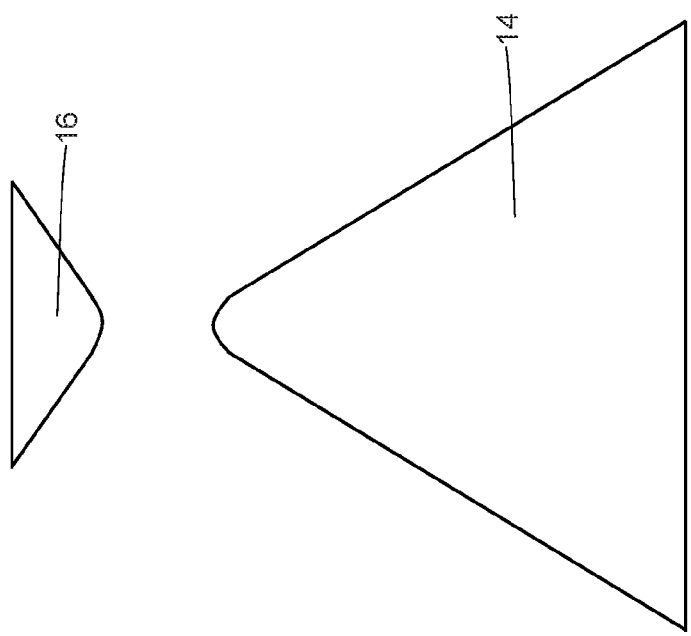

According to the embodiment illustrated in the attached figures, the tools 14 and 16 are wedge-shaped, whereas the countering elements 15 and 17 are flat. According to the embodiment shown in FIGS. 8, 10 and 11, the tools 14 and 16 have a pointed (more or less sharp) end portion. According to the different embodiment shown in FIG. 12, the tools 14 and 16 have a flat (or blunt) end portion. According to the further embodiment shown in FIG. 13, the tools 14 and 16 have a round (or rounded) end portion. The end portion of the tool 14 can also be different from the end portion of the tool 16 (for example, the end portion of the tool 14 may be sharp, whereas the end portion of the tool 16 may be blunt or rounded, or vice versa).

According to a possible embodiment, the two incisions 7 and 9 have the same extension, i.e. where the outer incision 7 is present, the inner incision 9 is also present, and vice versa. According to an alternative and equivalent embodiment, the outer incision 7 has a greater extension than the inner incision 9 (in this case, the outer incision 7 could also extend outside the pocket 4), i.e. where the inner incision 9 is present, the outer incision 7 is also present, but not vice versa. In fact, the outer incision 7 (in the portion superimposed on the inner incision 9) and the inner incision 9 serve to generate, when the sealed single-dose package 1 is bent into a "V", a controlled breakage of the sheet 2 of semi-rigid plastic material so as to allow the product 5 contained in the pocket 4 to come out. The outer incision 7 (also in any portion that is not superimposed on the inner incision 9) also serves to guide the V-bending of the sheet 2 of semi-rigid plastic material, so that the vertex of the V-bend of the sheet 2 of semi-rigid plastic material coincides with the incisions 7 and 9.

In the embodiment shown in the attached figures, the incisions 7 and 9 are continuous, i.e. without interruptions; according to an alternative and perfectly equivalent embodiment, not shown, the incisions 7 and 9 may be discontinuous, i.e. have one or more interruptions (in this case we can speak of two discontinuous incisions 7 and 9 or of a series of mutually aligned and spaced apart incisions 7 and 9).

The inner incision 9 could have variable depth along its length; this feature is preferable (but not strictly necessary) in order to improve the opening of the sealed single-dose package 1 when the sealed single-dose package 1 is bent into a "V". In other words, since the inner incision 9 has variable depth along its length, the sheet 2 of semi-rigid plastic material can break progressively when the sealed single-dose package 1 is bent into a "V". Similarly, the outer incision 7 could also have variable depth along its length. In other words, both the incisions 7 and 9 could have variable depths along their lengths, only one of the two incisions 7 and 9 could have variable depth along its length, or both incisions 7 and 9 could have constant depths along their lengths.

In the embodiment illustrated in the attached figures, the sealed single-dose package 1 has a rectangular shape; obviously, for aesthetic reasons, the sealed single-dose package 1 may have any other shape: a round shape, an elliptic shape, a "bottle"-like shape, a rhomboidal shape, a pentagonal shape, a hexagonal shape, a triangular shape, a square shape, a "bone"-like shape. Obviously, the outer surface 8 of the sheet 2 of semi-rigid plastic material and/or the outer surface of the sheet 3 of flexible plastic material can be printed both to display information on the product 5 and to enhance the look of the package.

In the embodiment illustrated in the attached figures, the sealed package 1 is a single-dose package (i.e., it contains a single dose of the product 5); according to other embodiments, not shown, the sealed package 1 contains multiple doses of the product 5, which are extracted from the sealed package 1 at different times (by bending the sealed package 1 into a "V", the product 5 can escape from the sealed package 1 through a break in the sheet 2 of semi-rigid plastic material, whilst by bringing the sealed package 1 flat again, the break in the sheet 2 of semi-rigid plastic material is recomposed, thereby substantially preventing further outflow of the product 5).

In the embodiment illustrated in the attached figures, the pocket 4 (containing the product 5) is defined between the sheet 2 of semi-rigid plastic material and the sheet 3 of flexible plastic material (which is superimposed on and sealed to the sheet 2 of semi-rigid plastic material). According to other embodiments, not shown, the pocket 4 (containing the product 5) is defined between the sheet 2 of semi-rigid plastic material and a more or less rigid boxshaped element (i.e. the sheet 2 of semi-rigid plastic material forms a wall of a box-like structure inside which the pocket 4 containing the product 5 is defined); in this case, in order to make the product 5 come out of the pocket 4, only the sheet 2 of semi-rigid plastic material is bent, not the whole sealed package 1. For example, in this embodiment, the sheet 2 of semi-rigid plastic material could be part of a larger blank, which is bent so that it assumes a closed shape delimiting therein the pocket 4 containing the product 5.

Figure 14:
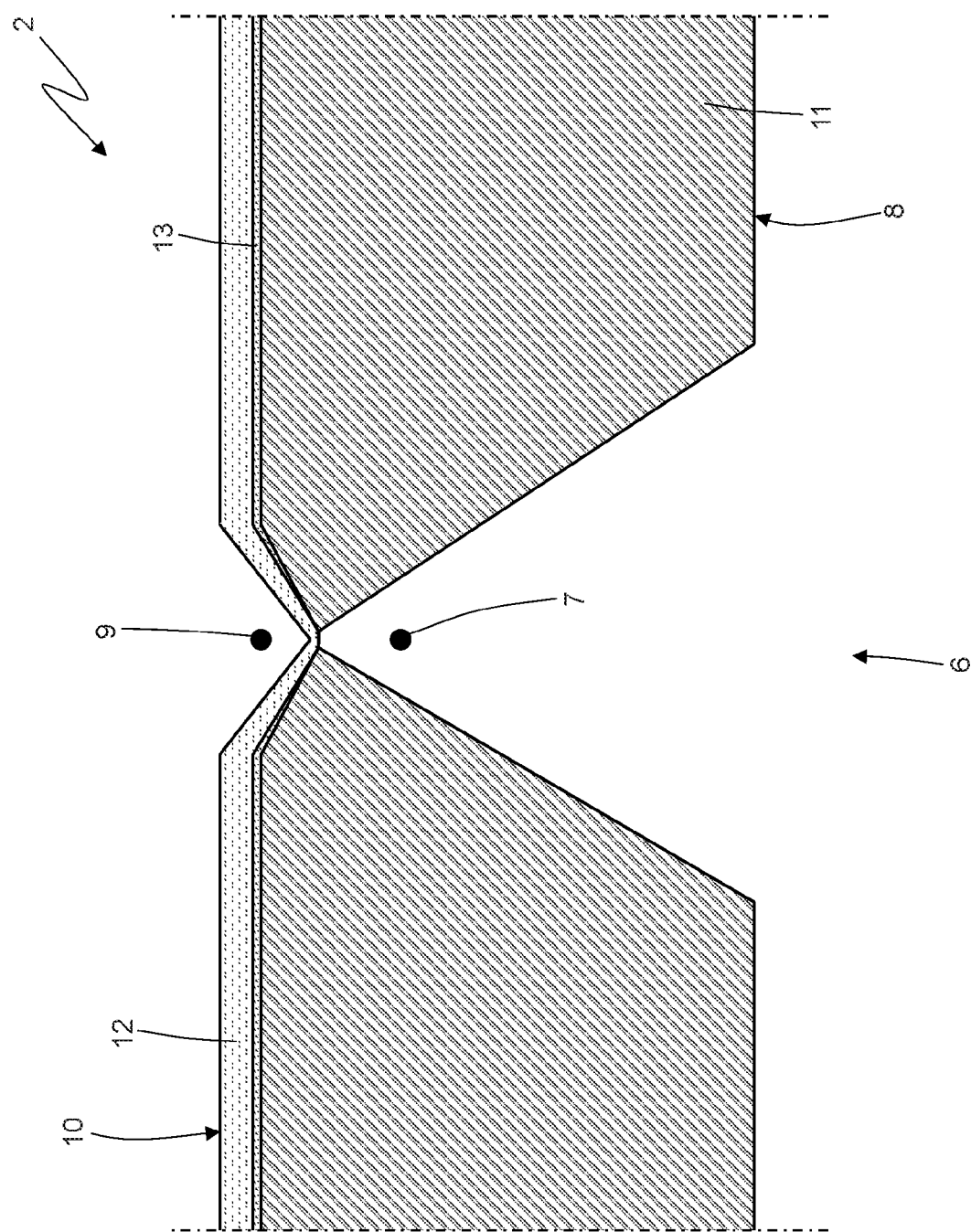
FIGS. 14 and 15 are two sectional views along the section line IV-IV of further respective embodiments of the sheet of semi-rigid plastic material.
Figure 15:
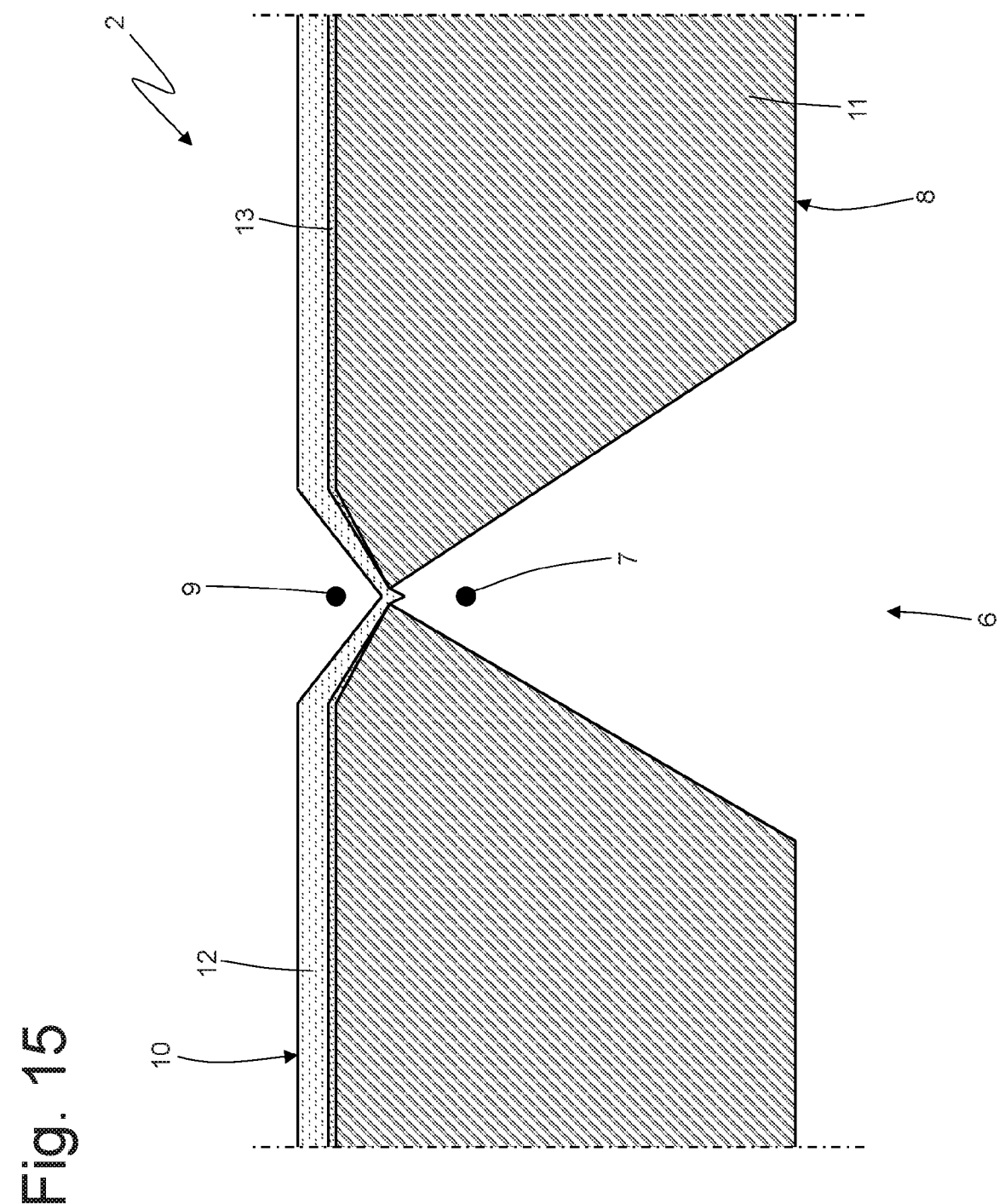

According to the alternative embodiment shown in FIGS. 14 and 15, only the heat-sealable layer 12 of the sheet 2 of semi-rigid plastic material partially penetrates (enters) the tip of the outer incision 7 (i.e. the barrier layer 13 of the sheet 2 of semi-rigid plastic material tears in the vicinity of the tip of the outer incision 7 and does not penetrate into the tip of the outer incision 7). In some situations and as shown in FIG. 15, a certain "build-up" of the barrier layer 13 can occur in the area of the tip of the inner incision 9 (i.e. in the area of the tip of the outer incision 7).

In other words, in the embodiment shown in FIGS. 14 and 15, between the bottom of the outer incision 7 and the bottom of the inner incision 9, only the heat-sealable layer 12 is present, but the supporting layer 11 is not present (i.e. it is absent), and the barrier layer 13 is also not present (i.e. it is absent). Accordingly, both the supporting layer 11 and the barrier layer 13 have an interruption (i.e. they are interrupted, absent) in the area of the bottom of the outer incision 7 and, therefore, also in the area of the bottom of the inner incision 9.

Importantly, the heat-sealable layer 12 of the sheet 2 of semi-rigid plastic material is locally plastically deformed (even in an irregular manner), but is not torn, i.e. it maintains its integrity, in the area of the inner incision 9. Obviously, during the break-opening of the sealed single-dose package 1 obtained by bending said sealed single-dose package 1 into a V shape, all three layers, i.e. the supporting layer 11, the heat-sealable layer 12 and the barrier layer 13, of the sheet 2 of semi-rigid plastic material need to be broken in the pre-weakened area 6.

The embodiment shown in FIG. 4 in which both layers 12 and 13 are arranged (at least partially intact) between the bottom of the outer incision 7 and the bottom of the inner incision 9, the embodiment shown in FIGS. 5 and 6 in which only and solely the barrier layer 13 is arranged (at least partially intact) between the bottom of the outer incision 7 and the bottom of the inner incision 9, or the embodiment shown in FIGS. 14 and 15 in which only and solely the heat-sealable layer 12 is arranged (at least partially intact) between the bottom of the outer incision 7 and the bottom of the inner incision 9, can be obtained by making the two incisions 7 and 9 as described above (i.e. making the inner incision 9 only after the outer incision 7 has been completed and by making the tool 16 perform a working stroke, which brings a tip of the tool 16 inside the outer incision 7). The type of configuration obtained (i.e. both layers 12 and 13 deform without tearing as shown in FIG. 4, only the barrier layer 13 deforms without tearing as shown in FIGS. 5 and 6, or only the heat-sealable layer 12 deforms without tearing as shown in FIGS. 14 and 15) depends on various factors including: the thickness of the heat-sealable layer 12, the material that makes up the heat-sealable layer 12 (i.e. the deformability and tensile strength of the material that makes up the heat-sealable layer 12), the thickness of the barrier layer 13, the material that makes up the barrier layer 13 (i.e. the deformability and tensile strength of the material that makes up the barrier layer 13), the conformation of the tips of the tools 14 and 16, and the stroke performed by the barrier layer 13.

In all embodiments shown in the attached figures, outside the inner incision 9 the heat-sealable layer 12 is perfectly flat and has a first constant thickness; instead, at the inner incision 9 the heat-sealable layer 12 is deformed so as to assume a V-shaped cross section with the tip of the "V" facing the bottom of the inner incision 9 and has a second variable thickness which is at least partially different from the first thickness; in particular, in the embodiments shown in FIGS. 5 and 6, the second variable thickness of the heat-sealable layer 12 becomes null (i.e. the heat-sealable layer 12 is interrupted).

In all embodiments shown in the attached figures, outside the inner incision 9 the barrier layer 13 is perfectly flat and has a third constant thickness; instead, at the inner incision 9 the barrier layer 13 is deformed so as to assume a V-shaped cross section with the tip of the "V" facing the bottom of the inner incision 9 and has a fourth variable thickness which is at least partially different from the third thickness; in particular, in the embodiments shown in FIGS. 14 and 15, the fourth variable thickness of the barrier layer 13 becomes null (i.e. the barrier layer 13 is interrupted).

The embodiments described herein may be combined with each other without departing from the scope of protection of the present invention.

The sealed single-dose package 1 described above has many advantages.

In the first place, the sealed single-dose package 1 described above is relatively simple to manufacture as it does not require the incision unit to be very precise and perfectly adjusted for making the incisions 7 and 9. This result is obtained thanks to the fact that the tip of the inner incision 9 overlaps the tip (therefore "enters" the tip) of the outer incision 7 with a degree of overlap which can vary (within a relatively wide range) without compromising the functionality of the incisions 7 and 9 (that is to say the pre-weakened area 6).

Lastly, the sealed package 1 described above is simple and inexpensive to manufacture, since the construction thereof is very similar to the construction of a similar standard single-dose sealed package; i.e. the sealed package 1 described above may be manufactured by an existing packaging machine, which manufactures standard sealed packages simply by adapting the incision unit alone.

LIST OF REFERENCE NUMERALS IN THE FIGURES

1 package
2 semi-rigid sheet
3 flexible sheet
4 pocket
5 product
6 pre-weakened area
7 outer incision
8 outer surface
9 inner incision
10 inner surface
11 supporting layer
12 heat-sealable layer
13 barrier layer
14 tool
15 countering element
16 tool
17 countering element

The invention claimed is:

1. A production method for producing a sealed break-open package (1);

the sealed package (1) comprises: a sheet (2); a sealed pocket (4), which contains a dose of a product (5) and is delimited on one side by the sheet (2); and a pre-weakened area (6), which is created in a central area of the sheet (2) so as to guide, following a bending of the sheet (2), a controlled breaking of the sheet (2) in the pre-weakened area (6) in order to cause the formation of an outlet opening for the product (5) through the sheet (2);

the packaging method comprises the steps of:

making, through an outer surface (8) of the sheet (2) and by means of a first tool (14), an outer incision (7), which at least partially extends into the area of the pocket (4); and making, through an inner surface (10) of the sheet (2) opposite the outer surface (8) and by means of a second tool (16), an inner incision (9), which is parallel to and aligned with the outer incision (7);

wherein the inner incision (9) is made only after the outer incision (7) has been completed and by making the second tool (16) perform a working stroke, which brings a tip of the second tool (16) inside the outer incision (7).

2. The production method according to claim 1, wherein:

the sheet (2) is made up of a laminate comprising: a supporting layer (11) arranged on the outside, a heat-sealable layer (12) arranged on the inside, and a barrier layer (13) interposed between the supporting layer (11) and the heat-sealable layer (12); and there is no supporting layer (11) between the bottom of the outer incision (7) and the bottom of the inner incision (9).

3. The production method according to claim 2, wherein between the bottom of the outer incision (7) and the bottom of the inner incision (9) there is only and solely the barrier layer (13).

4. The production method according to claim 2, wherein between the bottom of the outer incision (7) and the bottom of the inner incision (9) there is only and solely the heat-sealable layer (12).

5. The production method according to claim 2, wherein between the bottom of the outer incision (7) and the bottom of the inner incision (9) there are both the barrier layer (13) and the heat-sealable layer (12).

6. The production method according to claim 3, wherein:

outside the inner incision (9) the heat-sealable layer (12) is perfectly flat and has a first constant thickness; and at the inner incision (9) the heat-sealable layer (12) is deformed so as to assume a V-shaped cross section with the tip of the "V" facing the bottom of the inner incision (9) and has a second variable thickness which is at least partially different from the first thickness.

7. The production method according to claim 3, wherein:

outside the inner incision (9) the barrier layer (13) is perfectly flat and has a third constant thickness; and at the inner incision (9) the barrier layer (13) is deformed so as to assume a V-shaped cross section with the tip of the "V" facing the bottom of the inner incision (9) and has a fourth variable thickness which is at least partially different from the third thickness.

8. The production method according to claim 1, wherein, at first, only the outer incision (7) is made by means of the first tool (14), which is pushed into the sheet (2) through the outer surface (8), and by means of a first countering element (15), which rests against the inner surface (10) of the sheet (2).

9. The production method according to claim 8, wherein the first countering element (15), at first, remains far from the inner surface (10) and, as a consequence, when the first tool (14) comes into contact with the outer surface (8), at first, the sheet (2) slightly bends into a "V" shape until it rests against the first countering element (15), and only at this point the first tool (14) starts penetrating the sheet (2) through the outer surface (8).

10. The production method according to claim 1, wherein, after the outer incision (7) has been completed, the inner incision (9) is subsequently made by means of the second tool (16), which is pushed into the sheet (2) through the inner surface (10) and by means of a second countering element (17), which rests against the outer surface (8) of the sheet (2).

11. The production method according to claim 10, wherein the second countering element (17), at first, remains far from the outer surface (8) and, as a consequence, when the second tool (16) comes into contact with the inner surface (10), at first, the sheet (2) slightly bends into a "V" shape until it rests against the second countering element (17), and only at this point the second tool (16) starts penetrating the sheet (2) through the inner surface (10).

12. The production method according to claim 1, wherein the sheet (2) is made up of a laminate comprising:

a supporting layer (11) arranged on the outside, a heat-sealable layer (12) arranged on the inside, and a barrier layer (13) interposed between the supporting layer (11) and the heat-sealable layer (12);

outside the inner incision (9) the heat-sealable layer (12) is perfectly flat and has a first constant thickness, and at the inner incision (9) the heat-sealable layer (12) is deformed so as to assume a V-shaped cross section with the tip of the "V" facing the bottom of the inner incision (9) and has a second variable thickness which is at least partially different from the first thickness;

outside the inner incision (9) the barrier layer (13) is perfectly flat and has a third constant thickness, and at the inner incision (9) the barrier layer (13) is deformed so as to assume a V-shaped cross section with the tip of the "V" facing the bottom of the inner incision (9) and has a fourth variable thickness which is at least partially different from the third thickness; and there is no supporting layer (11) between the bottom of the outer incision (7) and the bottom of the inner incision (9).

13. The production method according to claim 12, wherein between the bottom of the outer incision (7) and the bottom of the inner incision (9) there is only and solely the barrier layer (13), which is partially arranged inside the outer incision (7).

14. The production method according to claim 12, wherein there is a build-up of the barrier layer (13) in the area of the bottom of the outer incision (7).

15. The production method according to claim 12, wherein between the bottom of the outer incision (7) and the bottom of the inner incision (9) there are both the barrier layer (13) and the heat-sealable layer (12).

* * * * *